Nov. 26, 1968  JAMES E. WEBB  3,413,536
ADMINISTRATOR OF THE NATIONAL AERONAUTICS
AND SPACE ADMINISTRATION
AUTOMATIC BATTERY CHARGER
Filed June 10, 1966  3 Sheets-Sheet 1

INVENTOR.
DAVID K. WARKENTINE
BY
ATTORNEYS

Nov. 26, 1968  JAMES E. WEBB  3,413,536
ADMINISTRATOR OF THE NATIONAL AERONAUTICS
AND SPACE ADMINISTRATION
AUTOMATIC BATTERY CHARGER

Filed June 10, 1966  3 Sheets-Sheet 2

INVENTOR.
DAVID K. WARKENTINE

BY
ATTORNEYS

INVENTOR.
DAVID K. WARKENTINE

United States Patent Office 3,413,536
Patented Nov. 26, 1968

3,413,536
AUTOMATIC BATTERY CHARGER
James E. Webb, Administrator of the National Aeronautics and Space Administration with respect to an invention of David K. Warkentine, La Puente, Calif.
Filed June 10, 1966, Ser. No. 557,861
5 Claims. (Cl. 320—17)

ABSTRACT OF THE DISCLOSURE

A plurality of series connected batteries are successively charged automatically from a charging current source. The battery charge, as measured by its output potential, is compared with a reference, and stepping-switch means are provided for adjusting the charge accordingly and, further, to indicate the charging state of the battery. When the battery is fully charged, the charging current is discontinued.

---

The invention described herein was made in the performance of work under a NASA contract and is subject to the provisions of Section 305 of the National Aeronautics and Space Act of 1958, Public Law 85–568 (72 Stat. 435; 42 USC 2457).

The subject invention relates to battery-chargers, and more particularly, to means for automatically charging a battery of electric storage cells.

The efficient utilization of electric storage batteries requires means for safely and efficiently recharging the cells of such batteries in a minimum amount of time and without damage to such cells. In this way a minimum investment in fewer numbers of storage batteries is required in order to sustain a battery-operated function. However, attempts at minimum charging times may often lead to overcharging of individual batteries, resulting in boiling over of the battery fluid, explosion, and possibly further property damage and personal injury as consequences of such overcharging. On the other hand, lower charging rates and constant monitoring of each cell to assure that safe charging rates are being employed, is time consuming and costly. The use of only a minimum charging current in a battery-charging operation dictates the connection of such batteries in series. However, such attempt to employ a minimum current source requires diligent supervision of the batteries of such series connection in order to assure that a selected charging level is at all times commonly satisfactory or safe for all of the batteries in such series connection.

While the prior art has addressed itself to various means for charging a plurality of batteries, none of such art has provided automatic means for safely charging a plurality of series-connected batteries in a minimum interval of time and requiring a minimum degree of human supervision or attendance. The patent literature of such prior art, for example, includes: Hoffman, 1,273,490; Hoffman, 1,362,794; Hersch, 1,389,871; Dawnheuser, 1,962,484; Woodbridge, 1,967,801; Richards, 2,311,574; Williams, 2,377,596; Albrand, 2,502,692; Salazar, 2,509,252; Berg, 2,627,060; Christie, et al., 2,650,339; Godshalk, et al., 2,791,749; Marriott, 2,899,624; Reed, Jr., 2,904,739; Medlar, 3,153,186; Saslow, 3,178,629.

The patent to Reed, Jr., 2,904,739, indicates the problem of charging batteries in series, while a number of elements useful in the battery charging art are shown in the patents to Woodbridge, Richards, Albrand, Berg, Hersh and Medlar. Godshalk teaches manual monitoring of individual cells of a battery-being-charged, while Saslow teaches remote monitoring of the charging of only an individual battery. Christie teaches varying the charging of a battery (or group of batteries) in accordance with a preselected timing program. Marriott teaches manual monitoring and adjustment of a battery charger. Salazar teaches automatic adjustment reduction of the charging rate for a group of batteries, but does not effect such control in response to automatically monitoring each of the individual batteries of a plurality of series connected batteries; nor does he teach the use of more than two alternative charging levels for minimizing the overall time to complete a charging operation. In other words, none of the prior art has provided means for safely and automatically charging a plurality of series connected storage batteries in a minimum amount of time and with a minimum of human attendance or intervention.

By means of the concept of the subject invention, such disadvantages of the prior art are overcome, and means are provided for automatically controlling the charging rate of a plurality of series connected storage batteries in response to a preselected charged condition in any one of the automatically, sequentially-monitored cells of a series-connected battery.

By means of the concept of the subject invention, less time and a minimum of human intervention are required in order to safely complete the charging of a plurality of series connected cells. Such advantage is obtained by automatic means for discretely reducing the charging current in response to a preselected charging state in any one of successively monitored ones of the series cells. Accordingly, it is an object of the subject invention to provide improved means for charging a storage cell.

It is another object of the invention to provide automatic means for safely charging a plurality of series connected cells.

It is still another object of the invention to provide automatic battery charging means which are safe and require a minimum of human intervention and attendance.

It is a further object of the invention to provide means for automatically reducing a charging current in response to a preselected charging condition occurring in any one of the storage cells being so charged.

It is a further object of the invention to provide automatic battery charging means having manual override provisions.

These and further objects of the invention will become apparent from the following description, taken together with the accompanying drawings, in which.

In the drawings, like reference characters refer to like parts.

Figure 1:
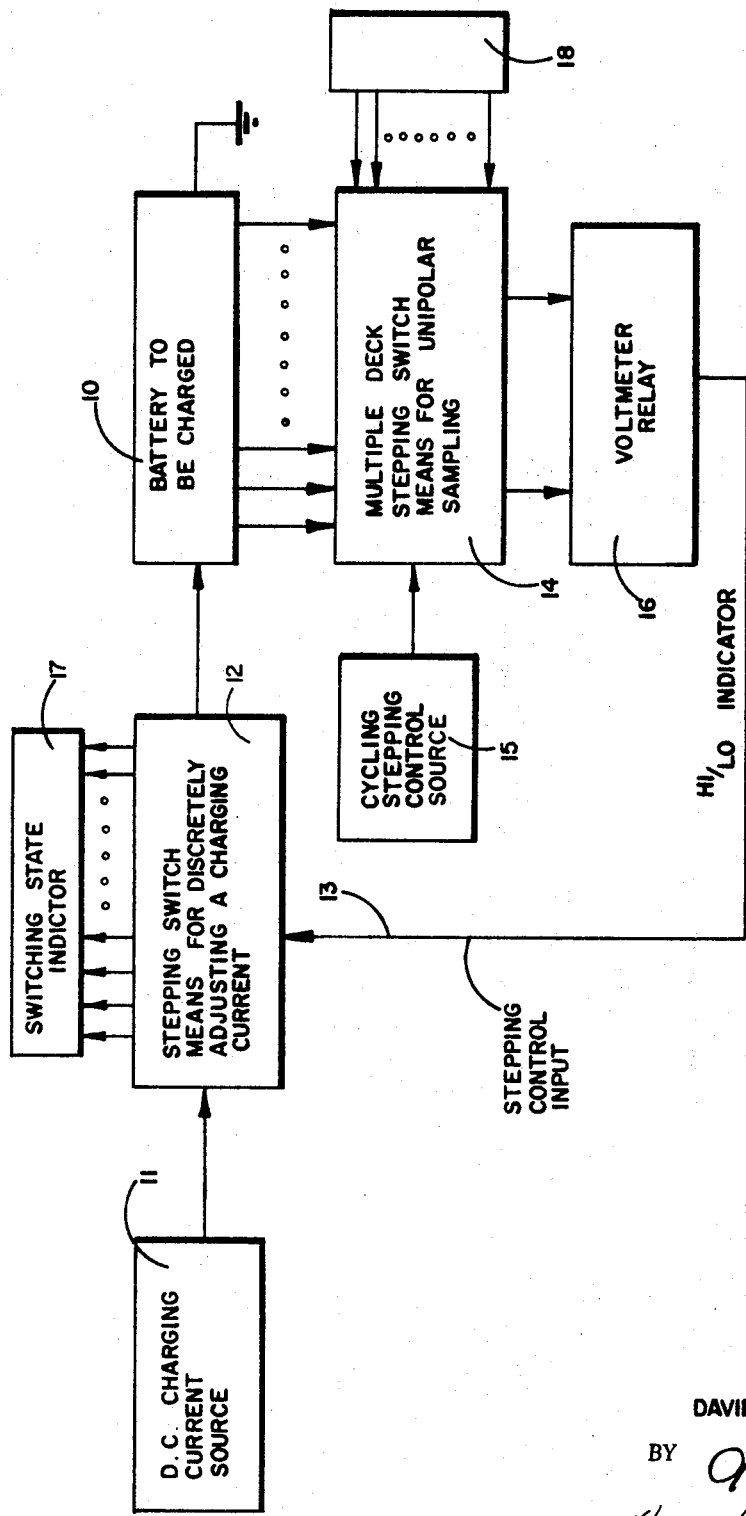
FIGURE 1 is a block diagram of a system embodying the concept of the invention.

Referring now to FIGURE 1, there is illustrated in block diagram form a system embodying the concept of the invention. There is provided apparatus for automatically charging a plurality of series-connected storage cells 10 from a source 11 of direct current, and comprising stepping switch means 12 for discretely adjusting the charging current provided by source 11 in response to a control signal applied to a control input 13 of switch means 12. There is also provided multiple deck stepping switch means 14 connected to battery 10 for cyclically unipolarly sampling successive ones of he cells of battery 10 in response to a control input from a source 15 of periodic switching control signals. There is further provided a unipolar voltmeter relay 16 responsive to the output of sampling means 14 for providing a control signal output indicative of a selected discrete charging state in a sampled one of the cells of battery 10, such output being fed as a control signal to the control input 13 of discrete current means 12.

In normal operation of the arrangement of FIGURE 1, switchable means 12 is adjusted to initially provide a minimum impedance to the charging current source 11, while sampling means 14 cyclically samples a progressive one of the cells of battery 10 in response to periodic switch-stepping control impulses from source 15. Upon a sampled one of the series connected cells of battery 10 reaching a selected voltage condition due to the time integral of the applied charging current, relay 16 responds to such condition by feeding a control signal to switchable means 12, switching it to a larger impedance condition, which lowers the charging current. Such lower charging current reduces the voltage state across the sampled battery, as is well understood in the art, corresponding to the removal of the preselected charging condition thereof and the restoration of a safe charging condition. The continued cyclical sampling of progressive ones of the cells of battery 10 allows further monitoring thereof by voltmeter relay 16. Upon a subsequent recurrence of the selected charging condition in one of the successively sampled cells, relay 16 again feeds a control signal to switchable means 12, thereby again discretely reducing the charging current supplied by source 11 to battery 10. Such cycle of successive discrete reductions in charging current may occur for as many switching states or discrete current states as are provided by switchable means 12, until the current is switched off.

Accordingly, it is to be appreciated that the arrangement of FIGURE 1 provides means for discretely reducing a charging current to progressively lower levels in response to a discrete charging state in an element being charged by such charging current. In this way, the charging rate is changed as required by an actual charging condition, rather than in accordance with an arbitrary time interval.

Referring again to FIGURE 1, there is also provided first and second switching state indicators 17, 18 for indicating the respective states of respective ones of switch means 12 and 14. In this way, the performance of various portions of the system, as functions of time, may be monitored. For example, the cyclical progression of the indication provided by indicator 18 indicates whether the cell-sampling function is being performed, while indicator 17 indicates the particular charging state of switchable means 12.

Figure 2:
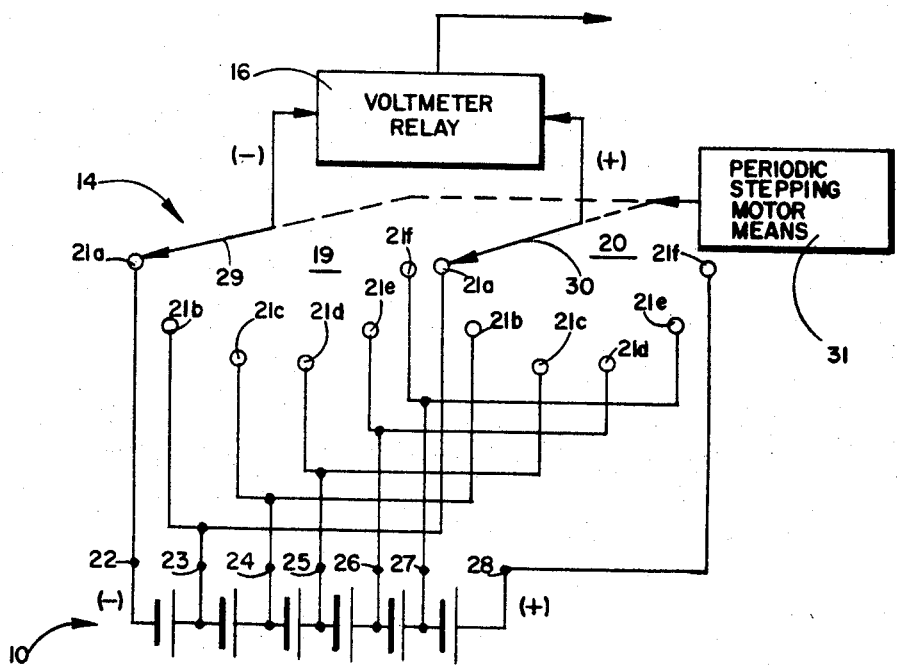
FIGURE 2 is a schematic arrangement of the cyclical unipolarity sampling device of FIGURE 1 for unipolarly sampling the voltage condition of successive ones of a plurality of series connected circuit elements.

The structural arrangement of FIGURE 1 for effecting the periodic sampling of the storage cells for automatic reduction of the charging current, as required, is the multiple-deck stepping switch 14, shown more particularly in FIGURE 2.

Referring to FIGURE 2, there is illustrated a schematic arrangement of the cyclical unipolarly sampling means of FIGURE 1. There is provided an indicator 16 such as a voltmeter relay for indicating the charged state of a storage cell, and a multiple deck stepping switch 14 interposed in circuit between indicator 16 and the serially interconnected cells of a battery 10 for causing indicator 16 to severally sample the condition of a successive one of such cells. Such multiple deck stepping switch may be comprised of a mutually ganged first and second like multiple tap switch 19 and 20, each switch having at least as many taps as potential sources or cells to be sampled. A first tap 21a of the first switching deck 19 is connected to a first end terminal 22 of the serially interconnected cells of battery 10, successive taps of deck 19 bein gconnected to successive interconnections between the serially interconnected cells. For example, each of taps 21b, 21c, 21d, 21e and 21f is connected to a respective one of intermediate terminals 23, 24, 25, 26 and 27. A corresponding first tap 21a of second switch deck 20 is connected to a second tap 21b of first deck 19, successive taps of second deck 20 being connected to successive ones of first deck 19, a last tap 21f of second deck 20 being connected to a second end terminal 28 of battery 10. For example, each of taps 21b, 21c, 21d and 21e of deck 20 are respectively connected to taps 21c, 21d, 21e and 21f of first deck 19. In other words, a last tap 21f of the second switching deck 20 is connected to the second end terminal 28 of battery 10 and preceding taps of deck 20 are respectively connected to preceding interconnections or intermediate terminals of battery 10.

The respective swingers 29 and 30 of switches 19 and 20 are connected across the input to voltmeter relay 16, thereby providing a unipolarly sampling input thereto in response to periodic stepping of the swingers 29 and 30 to successive tap positions by stepping switch motor means 31. Such multi-deck stepping switches and motive means for driving them are well known in the telephone switching art (as indicated, for example, in U.S. Patent 3,204,466 to Wingfield), and therefor such devices are illustrated only schematically in the arrangement of FIGURE 2.

The construction and arrangement of voltmeter relay 16 is also known in the art, as indicated for example, in the above noted U.S. Patents 2,627,060 and 2,502,692.

That the arrangement of FIGURE 2 provides means for unipolarly sampling the series connected cells of battery 10 may be appreciated from observing the interconnections of the taps of switches 19 and 20. As illustrated in FIGURE 2, swinger 29 is connected to negative end terminal 22 of battery 10 by means of terminal 21a of switch deck 19, while swinger 30 is connected to terminal 23 by means of tap 21a of deck 20, which terminal 23 is of a positive potential relative to terminal 22. Therefore, swinger 30, as illustrated, is at a positive potential relative to swinger 29. Now, if the swingers 29 and 30 are each advanced to a respective second tap 21b, then it will be seen that swinger 29 will be connected to terminal 23 by means of tap 21b of deck 19 and swinger 30 will be connected to terminal 24 by means of tap 21b of deck 20, which terminal 24 is at a positive potential relative to terminal 23. Hence, in the second tap position of swingers 29 and 30, swinger 30 is yet maintained at a positive potential relative to swinger 29. Stepping the ganged swingers to successive taps or switch positions may be seen to preserve the polarity or sense of the sampled potential across swingers 29 and 30. Accordingly, the illustrated interconnection of the taps of switching means 14 and cooperation with battery 10 provides means for unipolarly sampling the cells thereof.

Figure 3:
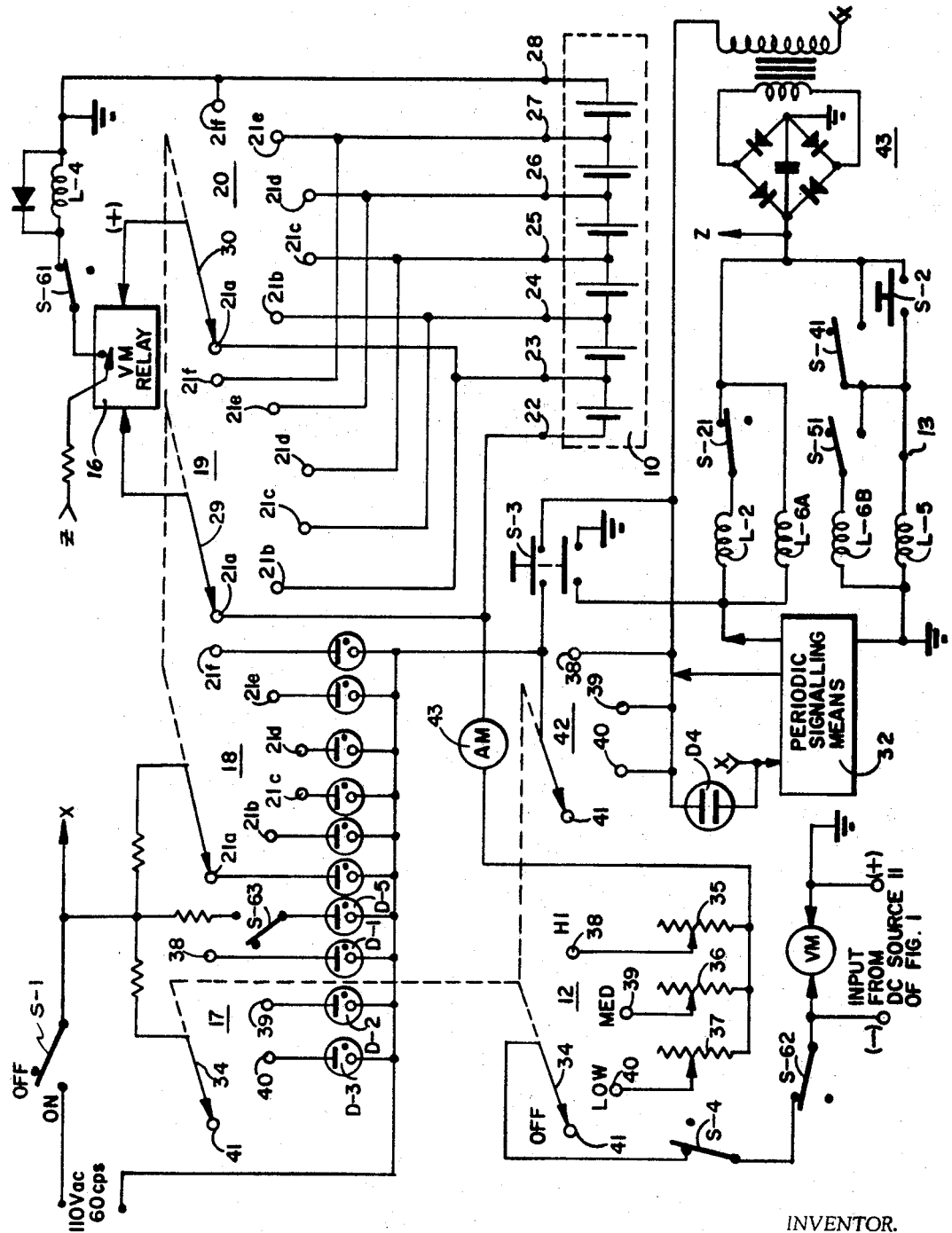
FIGURE 3 is a schematic arrangement of a preferred embodiment of the invention.

The utilization of the arrangement of FIGURE 2 in an embodiment of the system of FIGURE 1, is shown more particularly in FIGURE 3.

Referring now to FIGURE 3, there is illustrated a preferred embodiment of the battery charging system of FIGURE 1. There is provided multiple-deck stepping switch means comprising a first switching deck 12 for interposing alternative ones of successively larger impedances 35, 36 and 37 in series with a charging current source and a battery-to-be-charged 10, for current limiting purposes and discretely adjusting the rate at which battery 10 is charged. Such impedances are preferably adjustable impedances whereby suitably selected charging rates may be obtained from a variety of D-C charging current sources for various numbers of serially connected cells 10. The swinger 34 of switch deck 12 is stepped sequentially from tap 38 (representing a maximum charging rate condition) to successive ones of taps 39, 40 and 41 in response to a control signal impulse successively applied to a control input 13 of motive means L-5 of switch means 12 from an excitation source 43, until the charging current is finally removed, corresponding to the illustrated position of swinger 34 of switching deck 12 at tap 41.

The multiple deck switching means which comprises switching deck 12, further includes switching state indicator means comprising a second switching deck 17 having a swinger 34 and taps corresponding to those of deck 12 for connecting a corresponding one of indicating lamps D-1, D-2, and D-3 in circuit for indicating the charging state of the arrangement of FIGURE 3. There may be further provided a third switching deck 42 of such multiple-deck stepping switch means and having all but the last ("OFF") tap 41 commonly tied for exciting a lamp D-4 for indicating that the arrangement of FIGURE 3 is in a charging condition, as distinguished from an "OFF" condition.

There is also provided in FIGURE 3, a second multiple decking stepping switch, comprising switching decks 19 and 20 arranged to cooperate with voltmeter relay 16 in accordance with the arrangement of FIGURE 2 and further, including a third switching deck 18, elements 19 and 20 of FIGURE 3 corresponding to sampling means 14 of FIGURE 1 and relay means 16 and indicating means 18 corresponding to like referenced elements in FIGURE 1.

Periodic signalling means 32, such as a thermally delayed actuation control circuit, provides a source of periodic impulses to motive means L-2 for cyclical actuation of the mutually ganged switching decks 18, 19 and 20 (when switch S-1 is closed), thereby causing the swingers thereof to cyclically move from one to the other of successive taps thereof in sequence. In this way, the cells of battery 10 are unipolarly sampled by voltmeter relay in the manner described in connection with the description of the operation of the arrangement of FIGURE 2, while deck 18 excites an alternative one of a plurality of indicator lights to indicate the sampled one of the cells of battery 10.

Whenever a sampled one of the charging cells is indicated as being in a preselected charged condition, voltmeter relay closes, thereby energizing a relay coil L-4, causing switch S-41 to close (from a normally open state), connecting terminal 13 to excitation source 43. The connection of terminal 13 of the stepping switch motive means L-5 to excitation source 43, thereupon causes the swinger 34 of switching deck 12 (as well as those of decks 17 and 42) to be stepped, thereby discretely reducing the charging current to battery 10 to a next successive discrete level. Such reduction in the charging rate reduces the indicated voltage at the sampled cell, thereby reversing the state of relay 16. Such change in state removes the excitation from relay L-4, thereby opening switch S-41 and disconnecting terminal 13 of the stepping switch motor L-5 from excitation source 43.

In setting up the system of FIGURE 3 for starting the charging operation (with switch S-1 closed), a switch S-4, interposed in series with the DC charging current source 11 (not shown), is opened and the no-load voltage of the current source is adjusted to an end-of-charge voltage, determined as the end of charge voltage per cell multiplied by the number of cells being charged. Next, the trip voltage of the voltmeter relay is adjusted to the end-of-charge voltage rating per a single cell and then switch S-4 is closed (operatively connecting the charging current source to the apparatus of FIGURE 3). Then, a manually operated switch S-2, connected in parallel with or across relay switch S-41, is depressed successively, thereby actuating stepping relay motor L-5 and stepping switching deck 12 (and decks 17 and 42) to successive stepping positions. In the HI charge position (tap 38), indicated by excitation of lamp D-1, resistor 35 is adjusted to provide a maximum charging current which does not exceed a recommended maximum charging current, as indicated by a series connected ammeter 43. After the cells have stabilized for about five minutes, switch S-2 is momentarily closed again, thereby actuating stepping switch 12 to tap 39, corresponding to a medium charge position (indicated by excitation of lamp D-2); and resistor 36 is adjusted to provide a charging current approximately two-thirds the maximum charging current provided by resistor 35. Switch S-2 is again momentarily depressed, stepping switch 12 to tap 40, corresponding to a LOW or "trickle" charging ratio (indicated by excitation of lamp D-3); and resistor 37 is adjusted to provide a charging rate less than that provided by resistor 36 and preferably equal to ten percent of the maximum charging rate provided by resistor 35, or not exceeding the recommended prolonged charging rate. Next, depressing switch S-2 momentarily twice, steps switch 12 successively from top 40 to tap 41 (OFF), and from tap 41 to tap 38 (HI charge), from which latter position the charging operation begins.

In normal operation of the arrangement of FIGURE 3 (after the above described set-up), an initially maximum charging rate is applied to battery 10 by means of the cooperation of resistor 35, tap 38 and swinger 34 of switch 12, while periodic signalling means 32 periodically excites stepping motor L-2 for stepping switches 19 and 20 and actuation of relay switch S-21 (for resetting relay motor L-2). Upon a sampled one of the cells of battery 10 exceeding the threshold or charging voltage limit of voltmeter relay 16, relay 16 closes, exciting relay L-4 which closes switch S-41. The closing of switch S-41 excites stepping deck motor L-5, thereby (1) stepping deck switch 12 from HI charge terminal 38 to terminal 39, and (2) closing switch S-51. The closures of switches S-41 and S-51 excite a latching relay L-6B. The energization of latching relay L-6B opens a normally closed relay switch S-61 (in series with relay L-4), thereby de-energizing relay L-4. De-energizing relay L-4 restores switch S-41 to its normally open position, thereby de-energizing both stepping motor L-5 and relay L-6B. Such energization of relay L-6B also opens a normally closed switch S-62 (in series with the charging current source), which removes the terminal charging voltage condition from the sampled cell, thereby de-energizing voltmeter relay 16. Hence, the reclosing of normally-closed switch S-61 (in series with the now opened switch points of voltameter relay 16) is prevented from exciting relay L-4. Further, such interruption in the charging of battery 10 allows the cells thereof to stabilize and also allows any gassing of the cells to decrease to a safe level prior to continuation of further charging. This period of no-charging in the interval between stopping a higher charging rate and commencing a lower charging rate is referred to as a standby period, the occurrence of which is indicated by the illumination of lamp D-5, which occurs due to the closing of normally-open switch S-63 (by relay L-6B) concomitant with the opening of normally-closed switch S-62. In other words, the energization of latching relay L-6B opens normally-closed switches S-61 and S-62 and closes normally-open switch S-63.

The commencing of the next signalling cycle of periodic signalling means 32 subsequent to the switching interval corresponding to the standby period, energizes latching relay L-6A, resetting switches S-61, S-62 and S-63 to their normal conditions (as illustrated in FIGURE 3), restoring the charging condition, but at the next lesser discrete or intermediate level. Upon such commencing of such next signalling cycle, switching decks 19 and 20 continue sampling successive ones of the cells of battery 10, which are now being charged at the intermediate rate provided by reistor 36, as indicated by the illumination of lamp D-2.

Upon another subsequent recurrence, during the intermediate charging rate, of a preselected charging state in a sampled one of the cells and corresponding to the selected threshold of voltmeter relay 16, the above described cycle will be repeated whereby swinger 34 of switch 12 moves from tap 39 to tap 40, reducing the charging rate to the minimum or "trickle" rate. Upon a further recurrence of such cycle, swinger 34 of switch 12 moves to tap 41, thereby removing the charging current from battery 10; and swinger 34 of switch 42 (mutually ganged with switch 12) moves to tap 41, thereby removing all power from the periodic signalling means 32 and rectifier 43. Because of the "OFF" position of switch 42, stepping switch motor L–2 (for actuation of switching decks 18, 19 and 20) is no longer cyclically actuated. Hence, if it is desired to again monitor the cells of battery 10 before removing them from the charger (of FIGURE 3), such monitoring may be performed by manually depressing successively a normally-open, double pole switch S–3, one pole of which is in parallel with switch 42 (for exciting relay power supply 43) and the other of which provides an alternate ground circuit for excitation of stepping motor L–2.

It will be obvious to those skilled in the art that if an independent DC current source 11 is not desired, that lamp D4 may be replaced by an AC receptical to provide a power source that could be rectified and used for the DC current source 11. When charging of the batteries is complete, the swinger of switch 42 moving to off tap 41 would also turn off DC current source 11.

Hence, it is to be appreciated that there has been described automatic means for safely charging a battery at a maximum charging rate, which rate is successively and discretely reduced in response to the occurrence of a selected charging condition in any one of the cells being charged. Further, although the device provides automatic charging, requiring a minimum of human attendance, yet provisions are included for manual control, adjustment and override of the charging procedure. Accordingly, the device of the invention provides improved means for the automatic charging of storage batteries.

Although the invention has been described and illustrated in detail, it is to be clearly understood that the same is by way of illustration and example only and is not to be taken by way of limitation, the spirit and scope of this invention being limited only by the terms of the appended claims.

What is claimed is:

1. Apparatus for automatically charging a plurality of series connected storage cells from a source of direct current, comprising:

first switchable means adapted to be connected in series with said series connected cells and said current source for discretely and progressively reducing a charging current rate at which said cells are charged;

first relay switching means for progressively switching said switchable means in response to a first relay control signal input;

second switchable means adapted to be connected to said cells for indicating the existence of a selected discrete charging state in a selected one of said series of cells;

second relay switching means for cyclically switching said second switchable means to sample a successive one of said cells;

said first relay switching means being responsively coupled to said first switchable means for switching said first switchable means in response to the indicated existence of said selected discrete charging state as a first relay control signal input.

2. The device of claim 1 in which there is further provided means for inoperatively disconnecting said second switchable means from said second relay means upon said first switchable means discretely reducing said charging rate to zero.

3. The device of claim 2 in which there is further provided manually operated override switching means for switching said second switchable means for manual monitoring the charged condition of successive ones of said cells.

4. In an apparatus for automatically charging a plurality of series connected cells, the combination comprising:

a first stepping switch having at least one deck with taps adapted for connecting current limiting resistors in series with said plurality of cells, the resistor associated with a successive one of said taps successively reducing the charging rate of said cells, a swinger of said switch engaging a successive one of said taps in response to a control signal sequentially applied to a stepping control input;

a second stepping switch having at least two decks of taps, a first tap of said first deck adapted to be connected to a first end terminal of said series connected cells and successive taps of said first deck adapted to be connected to successive interconnections between said series connected cells, a corresponding first tap of said second deck being connected to the second tap of said first deck and successive terminals of said second deck connected to successive terminals of said first deck, a last terminal of said second deck adapted to be connected to a second end terminal of said series connected cells, a first and second swinger of said second switch engaging a respective successive one of the taps of an associated first and second deck in response to control signals successively applied to a stepping control input, a source of periodic signals applied to said control input of said second switch; and a voltmeter relay connected across the swingers of said second stepping switch for indicating a preselected discrete state of a successive one of said cells, said first stepping switch being responsively connected to the output of said relay as a stepping control input.

5. The device of claim 4 in which there is further provided means for indicating the respective states of each of said stepping switches comprising an additional switching deck added to each of said stepping switches, an indicator light being connected in series with each of the taps of said additional decks corresponding to other than an off state of the associated one of said stepping switches, a swinger of each said additional deck being adapted to be connected to a source of excitation.

References Cited

UNITED STATES PATENTS

| | | | |
|---|---|---|---|
| 2,635,221 | 4/1953 | Harvey | 320—23 X |
| 3,278,824 | 10/1966 | Runyon | 320—48 X |
| 3,293,529 | 12/1966 | Fontaine | 320—15 |
| 3,305,754 | 2/1967 | Oaks et al. | 320—48 X |

LEE T. HIX, *Primary Examiner.*

STANLEY WEINBERG, *Assistant Examiner.*